United States Patent
Hsieh et al.

(10) Patent No.: US 7,445,665 B2
(45) Date of Patent: Nov. 4, 2008

(54) METHOD FOR DETECTING THE CLEANLINESS OF A FILTER

(75) Inventors: Chia-Chang Hsieh, Tainan (TW); Hung-Jen Wei, Nantou (TW)

(73) Assignee: Qisda Corporation, Taoyuan County (TW)

( * ) Notice: Subject to any disclaimer, the term of this patent is extended or adjusted under 35 U.S.C. 154(b) by 595 days.

(21) Appl. No.: 11/062,873

(22) Filed: Feb. 23, 2005

(65) Prior Publication Data

US 2005/0188842 A1    Sep. 1, 2005

(30) Foreign Application Priority Data

Feb. 26, 2004    (TW) ............... 93105009 A

(51) Int. Cl.
*B01D 39/00* (2006.01)
(52) U.S. Cl. ............ 96/417; 96/418; 96/419; 96/422; 55/385.6; 55/467
(58) Field of Classification Search ............ 55/385.6, 55/397, 418, 419, 422, 467, 417
See application file for complete search history.

(56) References Cited

U.S. PATENT DOCUMENTS 4,786,295 A * 11/1988 Newman et al. ............ 96/400
2002/0066372 A1 * 6/2002 White ..................... 96/424

FOREIGN PATENT DOCUMENTS

DE    4430557 A1 * 3/1996
JP    04198664 A * 7/1992
TW    252662    7/1995

* cited by examiner

*Primary Examiner*—Robert A. Hopkins

(57) ABSTRACT

A method for detecting the cleanliness of a filter. The filter is disposed on an air inlet or an air outlet of a fan. The method includes the following steps. At first, outputting a rotation control voltage to the fan, and an airflow generated by the rotation of the fan flows through the filter. Then, detect an actual rotation rate of the fan, and calculate an actual dust value f1 according to the actual rotation rate and the rotation rate control voltage. Then, a dust upper limit value of the filter is defined. Finally, the cleanliness of the filter is determined according to the actual dust value and the dust upper limit value.

13 Claims, 3 Drawing Sheets

METHOD FOR DETECTING THE CLEANLINESS OF A FILTER

This application claims the benefit of Taiwan application Serial No. 93105009, filed Feb. 26, 2004, the subject matter of which is incorporated herein by reference.

BACKGROUND OF THE INVENTION

1. Field of the Invention

The invention relates in general to a method for detecting the cleanliness of a filter, and more particularly to a method for determining the cleanliness of the filter according to a rotation control voltage received by the fan and an actual rotation rate outputted by the fan.

2. Description of the Related Art

Living in modern age with rapid advance and continual renovation in technology, electronic device has become an indispensable appliance to modern people in their everyday life. The ventilation quality of an electronic device such as desktop computer, notebook computer or projector has much to do with the stability of system operation and the lifespan of the product. Taking the notebook computer for example, in order to ventilate the heat generated by the computer system more efficiently, a computer is normally equipped with a fan to facilitate a normal operation of the computer system under appropriate environmental temperature. Generally speaking, a filter is disposed on an air inlet or air outlet of a fan, wherein the filter can be disposed inside or on the surface of the electronic device, so that the airflow generated when the fan rotates can flow through the filter. Before dusts are accumulated on the filter, the actual rotation rate of the fan corresponds to the rotation control voltage outputted by the central process unit (CPU). That is to say, the CPU outputs a rotation control voltage to the fan, wherein the rotation control voltage corresponds to a pre-set rotation rate which is equal to the actual rotation rate of the fan.

When the fan rotates, dusts tend to deposit on the filter. When too many dusts are deposited on the filter, airflow that flow through the filter will become smaller. Meanwhile, the actual rotation rate of the fan becomes faster than the corresponding pre-set rotation rate of the rotation control voltage. Consequently, the fan will be unable to ventilate the heat outside the electronic device, severely affecting the operation efficiency of the electronic device. Unless the user clean the filter periodically, otherwise it is not easy to be aware that the filter needs to be cleaned or replaced because too many dusts have deposited on the filter. Especially for the filter deposited inside the electronic device, the user cannot gain any knowledge of the cleanliness of the filter just by observing the appearance of the electronic device, unless the electronic device is disassembled and checked. However, such an inspection is very troublesome to the user. How to develop a technology which reminds the user to clean the filter with too many dusts deposited thereon has thus come to the fore.

SUMMARY OF THE INVENTION

It is therefore an object of the invention to provide a method for detecting the cleanliness of a filter.

The invention achieves the above-identified object by providing a method for detecting the cleanliness of the filter, wherein the filter is disposed on an air inlet or air outlet of a fan. The method, firstly, outputs a rotation control voltage to the fan, wherein the airflow generated by the rotation of the fan flows through the filter. Next, detect an actual rotation rate of the fan. Then, calculate an actual dust value f1 according to the actual rotation rate and the rotation control voltage. After that, provide a dust upper limit value fm of the filter. Then, determine the cleanliness of the filter according to the actual dust value f1 and dust upper limit value fm.

With the design of using the actual rotation rate outputted by the fan and the rotation control voltage received by the fan to the cleanliness of the filter, the design can remind the user to clean the filter with too many dusts deposited thereon, lest the filter might be blocked and the ventilation effect of the fan be affected.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
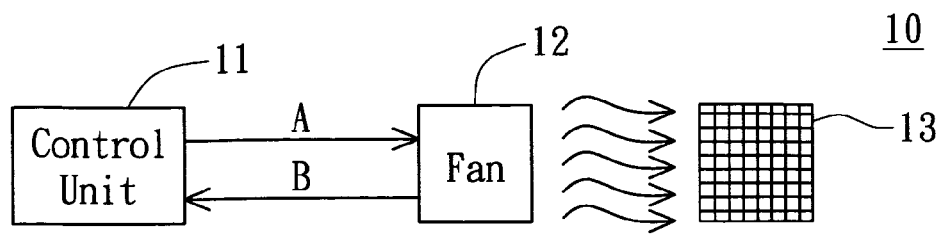
FIG. 1 is a diagram of an electronic device according to a preferred embodiment of the invention.

Referring to FIG. 1, a diagram of an electronic device according to a preferred embodiment of the invention is shown. In FIG. 1, the electronic device 10 at least includes a control unit 11, a fan 12 and a filter 13. The control unit 11 outputs a rotation control voltage A to the fan 12, wherein the rotation control voltage A corresponds to a pre-set rotation rate. After receiving the rotation control voltage A, the fan 12 starts to rotate, meanwhile, the control unit 11 detects an actual rotation rate B of the fan 12. The filter 13 is disposed on an air outlet or air inlet of the fan 12, wherein the airflow generated by the rotation of the fan 12 flows through the filter 13. The control unit 11 determines the cleanliness of the filter 13 according to the actual rotation rate B and the rotation control voltage A.

Figure 2:
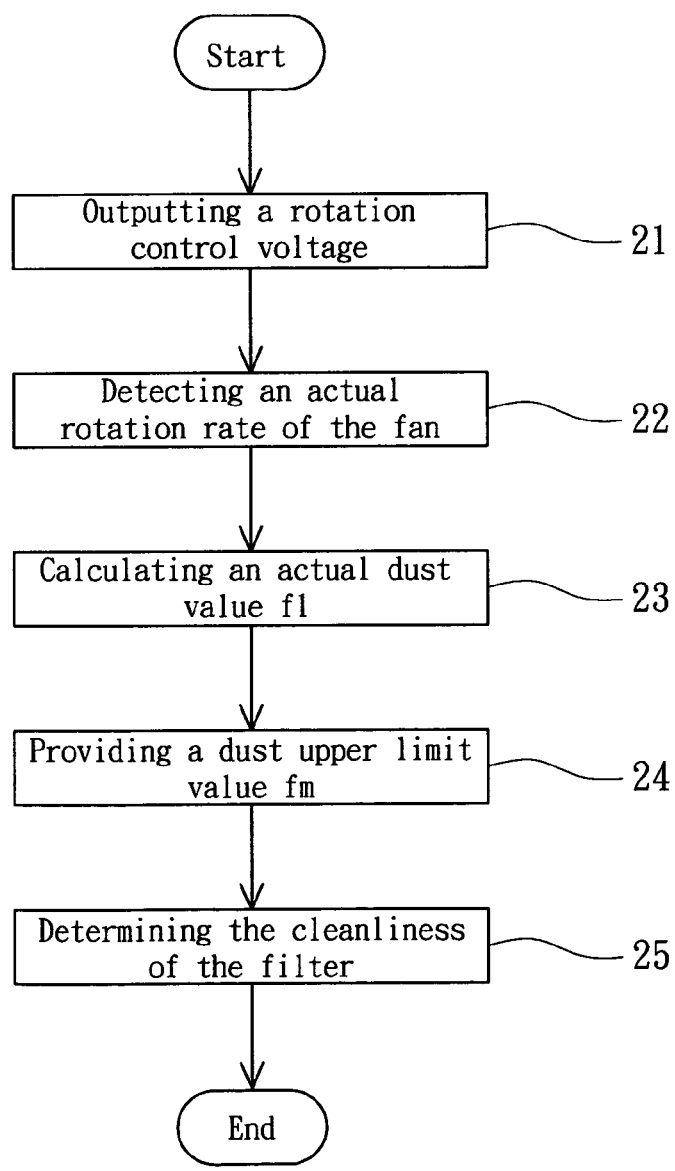
FIG. 2 is a flowchart of a method for detecting the cleanliness of a filter according to a preferred embodiment of the invention.

Referring to FIG. 2, a flowchart of a method for detecting the cleanliness of a filter according to a preferred embodiment of the invention is shown. Refer to FIG. 1 and FIG. 2 together. In step 21, the control unit 11 outputs a rotation control voltage A to the fan 12 for driving the fan 12 to rotate. The airflow generated by the rotation of the fan 12 flows through the filter 13. Besides, the rotation control voltage A corresponds to a pre-set rotation rate. Next, proceed to step 22, the control unit 11 detects an actual rotation rate B outputted by the fan 12.

Then, proceed to step 23, the control unit 11 calculates an actual dust value f1 according to the actual rotation rate B and the rotation control voltage A, wherein the actual dust value f1 is a ratio X of the actual rotation rate B to the rotation control voltage A, for instance, X=B/A (rpm/V).

The actual dust value f1 is obtained according to the steps below. Firstly, convert the detected actual rotation rate B into a rotation pulse frequency C. Next, calculate the ratio of the rotation pulse frequency C to the rotation control voltage A, for instance, C/A (Hz/V), to generate the actual dust value f1.

Figure 3:
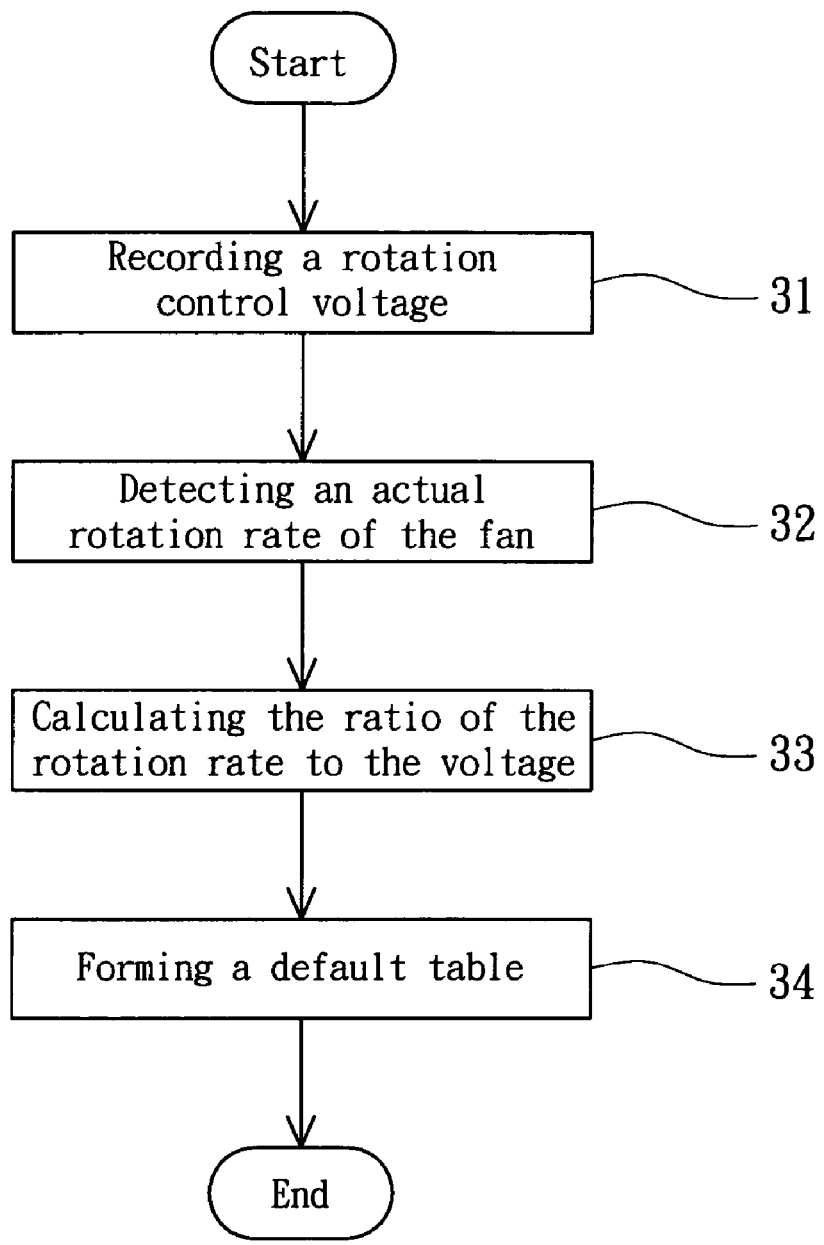
FIG. 3 is a flowchart of setting a default value table according to a preferred embodiment of the invention.

After actual dust value f1 is calculated, proceed to step 24, the control unit 11 provides a dust upper limit value fm to the filter 13. The dust upper limit value fm is obtained according to the rotation control voltage A and a default value table. The default value table is set according to the steps shown in FIG. 3. Firstly, in step 31, use a filter with known dust volume, which has too many dusts deposited thereon and needs to be cleaned. The filter is treated as a filter with a dust upper limit value fm. In step 31, record the rotation control voltage a1 inputted to the fan 12. Next, proceed to step 32: detect an actual rotation rate e1 of the fan 12. Then, proceed to step 33: calculate a corresponding ratio z1 of the rotation rate to the voltage, for instance z1=e1/a1. Next, proceed to step 34: calculate each of the corresponding ratios z2~zn of the rotation rate to the voltage and record the ratios to form a default value table under different rotation control voltage a2~an. The steps to set the default value table terminate.

Figure 4:
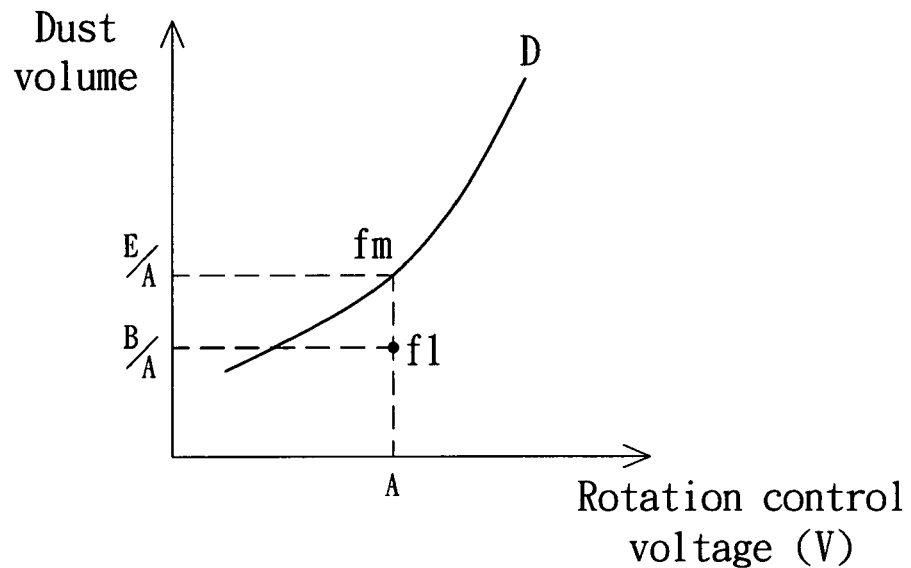
FIG. 4 is a rectangular co-ordinate diagram showing the state when an actual dust value f1 is smaller than a dust upper limit value fm.
Figure 5:
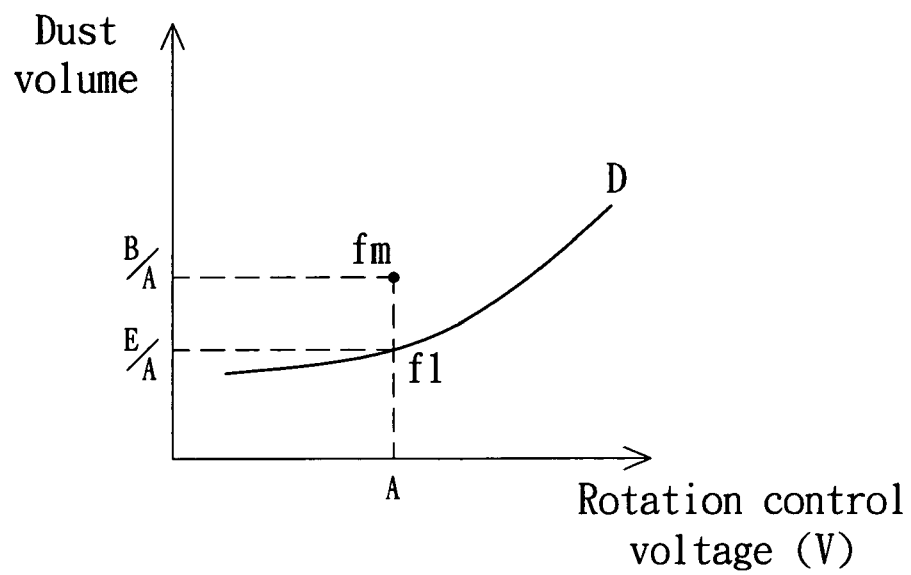
FIG. 5 is a rectangular co-ordinate diagram showing the state when the actual dust value f1 is larger than the dust upper limit value fm due to excess dust on the filter.

The ratio z of rotation rate to voltage can be treated as the required "energy" for the fan to deliver the airflow through the filter. The more dusts are deposited on the filter, the more "energy" is required for the fan to deliver the airflow through the filter. As a result, the rotation rate z of voltage becomes larger. So, the ratio z represents the dust volume deposited on the filter. As shown in FIGS. 4~5, the horizontal axis represents the rotation control voltage (V), while the vertical axis represents the dust value of the filter 13, so the data recorded in the default value table will form a reference curve D of the dust upper limit value fm.

After that, the method proceeds to step 25, meanwhile, the control unit 11 determines the cleanliness of the filter 13 according to the actual dust value f1 and the dust upper limit value fm, the method terminates. As shown in FIG. 4, when the rotation control voltage equals A, the spontaneous dust upper limit value fm according to the reference curve D can be obtained. Besides, the actual dust value f1 can be calculated according to the actual rotation rate B and the rotation control voltage A of the fan 12. If the actual dust value f1 is smaller than the dust upper limit value fm, the dust volume deposited on the filter 13 is lower than the dust upper limit value, and there is no need to remind the user to clean the filter 13.

Refer to FIG. 5, after contrasting the reference curve D, if the actual dust value f1 is found to be larger than or equal to the dust upper limit value fm, in other words, the actual rotation rate B is faster than the corresponding pre-set rotation rate of the rotation control voltage A due to excess dusts on the filter 13. Meanwhile, the control unit 11 will drive the electronic device 10 to send a warning signal to remind the user that too many dusts are deposited on the filter 13 and that the filter 13 needs to be cleaned. The above warning signal can be a lamp signal, a sound or an on screen display (OSD) signal sent by other elements of the electronic device 10 driven by the control unit 11.

Anyone who is familiar with the technology will understand that the technology of the invention is not limited thereto. For example, the electronic device 10 can be a desktop computer, a notebook computer or a projector. Besides, the method for detecting the cleanliness of a filter according to the invention can be further applied in any electronic device having a fan and a filter, such as an air conditioner, a heater, a dehumidifier, an air cleaner or an air refresher.

The method for detecting the cleanliness of a filter disclosed above has the design of using the actual rotation rate outputted by the fan and the rotation control voltage received by the fan to the cleanliness of the filter, the design can remind the user to clean the filter with too many dusts deposited thereon, lest the filter might be blocked and the ventilation effect of the fan be affected.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for detecting a cleanliness of a filter, the filter being disposed on an air inlet or an air outlet of a fan, the method comprising:
    outputting a rotation control voltage to the fan, wherein an airflow generated by the rotation of the fan flows through the filter;
    detecting an actual rotation rate of the fan;
    calculating an actual dust value f1 according to the actual rotation rate and the rotation control voltage;
    providing a dust upper limit value fm of the filter; and
    determining the cleanliness of the filter according to the actual dust value f1 and the dust upper limit value fm.

2. The method according to the claim 1, wherein the step of determining the cleanliness further comprises:
    sending a warning signal of excess dust when the actual dust value f1 is larger than or equal to the dust upper limit value fm.

3. The method according to the claim 1, wherein the step of determining the cleanliness further comprises:
    sending a warning signal of excess dust when the actual dust value f1 is larger than the dust upper limit value fm.

4. The method according to the claim 1, wherein the step of determining the cleanliness further comprises:
    sending a warning signal to remind that the filter needs to be cleaned when the actual dust value f1 is larger than the dust upper limit value fm.

5. The method according to the claim 1, wherein the step of determining the cleanliness further comprises:
    sending a warning signal to remind that the filter needs to be cleaned when the actual dust value f1 is larger than or equal to the dust upper limit value fm.

6. The method according to the claim 5, wherein the warning signal is a lamp signal.

7. The method according to the claim 5, wherein the warning signal is a sound.

8. The method according to the claim 5, wherein the filter is disposed in an electronic device, the warning signal is an on screen display (OSD) signal of the electronic device.

9. The method according to the claim 1, wherein the rotation control voltage corresponds to a pre-set rotation rate.

10. The method according to the claim 1, wherein the actual dust value f1 is the ratio of actual rotation rate to the rotation control voltage.

11. The method according to the claim 1, wherein the actual dust value f1 is calculated according to the steps below:
    converting the detected actual rotation rate to a rotation pulse frequency; and
    calculating the ratio of the rotation pulse frequency to the rotation control voltage to generate the actual dust value f1.

12. The method according to the claim 1, wherein the dust upper limit value fm is obtained according to the rotation control voltage and a default value table.

13. The method according to the claim 12, wherein the default value table is calculated according to the steps below:

recording the rotation control voltage inputted to the fan when the filter has a pre-set dust upper limit value;

detecting the actual rotation rate of the fan;

calculating a corresponding ratio of the actual rotation rate to the rotation control voltage to obtain the dust upper limit value fm corresponding to the rotation control voltage; and calculating the ratio of each rotation control voltage to the corresponding actual rotation rate to record as the default value table under different rotation control voltages.

* * * * *